A. P. GUSTAFSON.

TRACKING DEVICE FOR AUTOMATIC MUSICAL INSTRUMENTS.

APPLICATION FILED MAY 26, 1920.

Reissued Apr. 11, 1922. 15,332.

3 SHEETS—SHEET 1.

Inventor
Adolph P. Gustafson
by A. Miller Belfield Atty.

A. P. GUSTAFSON.

TRACKING DEVICE FOR AUTOMATIC MUSICAL INSTRUMENTS.

APPLICATION FILED MAY 26, 1920.

Reissued Apr. 11, 1922. 15,332.

3 SHEETS—SHEET 2.

Inventor
Adolph P. Gustafson
by A. Miller Belfield Atty.

A. P. GUSTAFSON.
TRACKING DEVICE FOR AUTOMATIC MUSICAL INSTRUMENTS.
APPLICATION FILED MAY 26, 1920.
Reissued Apr. 11, 1922. 15,332.
3 SHEETS—SHEET 3.
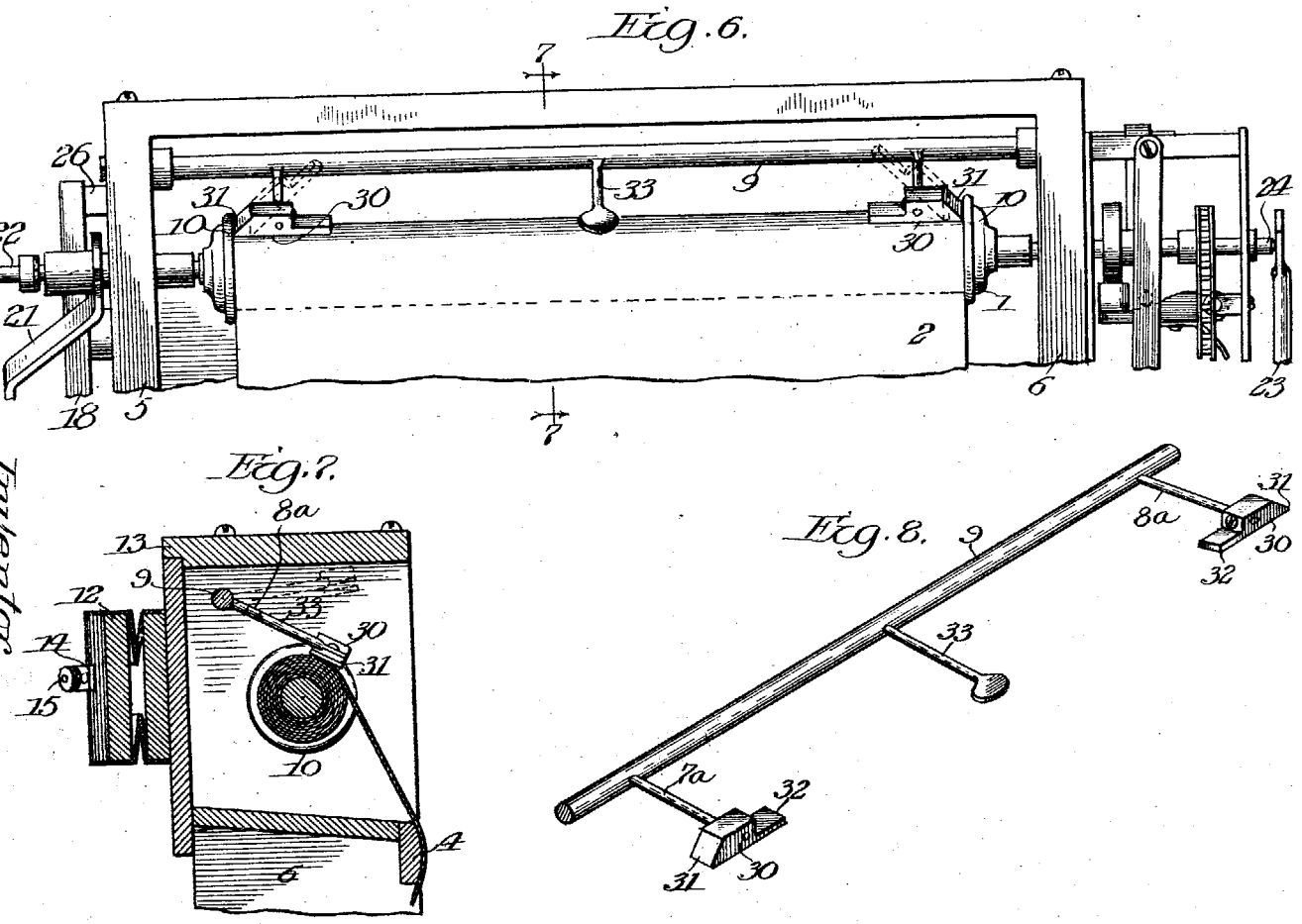
Inventor
Adolph P. Gustafson
by A. Miller Belfield Atty.

UNITED STATES PATENT OFFICE.

ADOLPH PETER GUSTAFSON, OF CHICAGO, ILLINOIS, ASSIGNOR TO M. SCHULZ COMPANY, OF CHICAGO, ILLINOIS.

TRACKING DEVICE FOR AUTOMATIC MUSICAL INSTRUMENTS.

Specification of Reissued Letters Patent. Reissued Apr. 11, 1922.

15,332.

Original No. 1,313,226, dated August 12, 1919, Serial No. 62,265, filed November 19, 1915. Application for reissue filed May 26, 1920. Serial No. 384,479.

*To all whom it may concern:*

Be it known that I, ADOLPH P. GUSTAFSON, a citizen of the United States, residing at Chicago, in the county of Cook and State of Illinois, have invented certain new and useful Improvements in Tracking Devices for Automatic Musical Instruments, of which the following is a specification.

My invention relates to tracking devices for automatic musical instruments, especially to instruments employing a traveling music sheet or web.

The principal object of the invention is to arrange for the simple and effective control of the traveling sheet or web so as to place it in proper tracking position at or before the beginning of the playing of the instrument, and to maintain it in such proper tracking position throughout the playing.

In the accompanying drawings Fig. 1 is a front elevation of a part of an automatic musical instrument and a traveling music sheet therein, together with tracking mechanism embodying my present invention;

Fig. 6 is an elevation similar to Fig. 1, of a modified form of the invention;

Fig. 7 is a cross section taken on line 7—7 in Fig. 6;

Fig. 8 is a perspective view of a portion of the device shown in Figs. 6 and 7.

Figure 1:
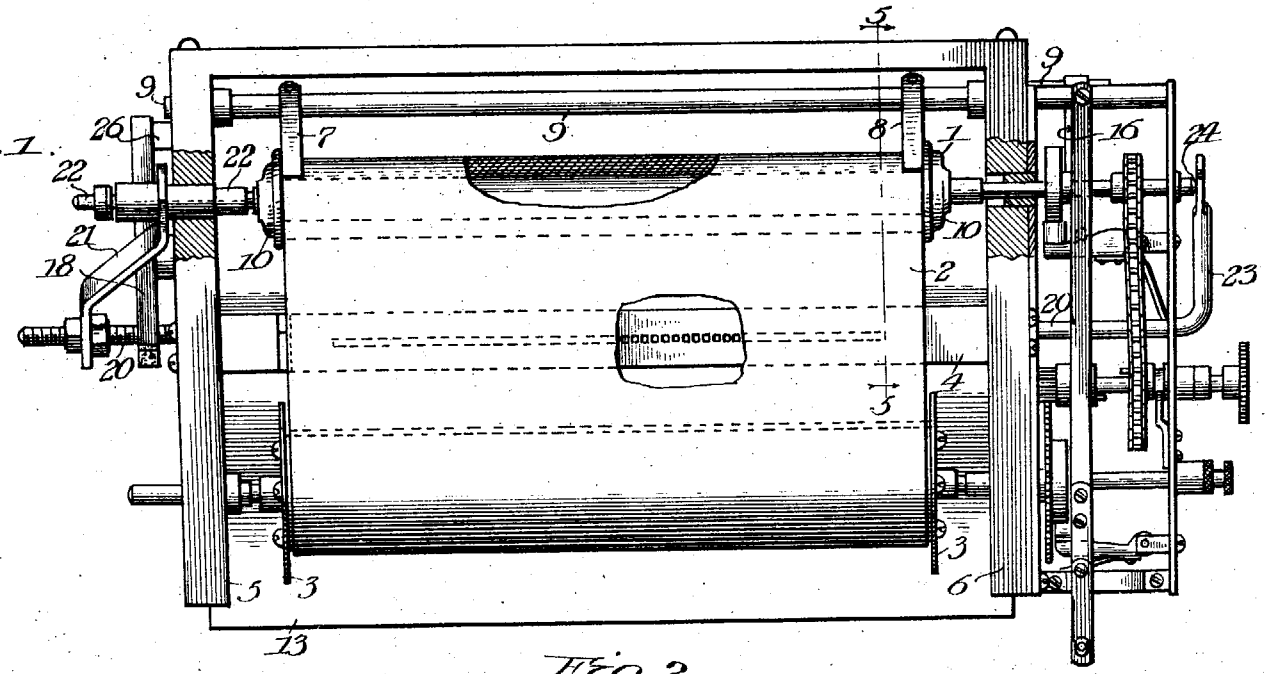

In the drawings, and especially in Figs. 1–5, inclusive, I show a music spool 1 carrying a sheet or web 2 and a take-up roll 3, these parts being such as are ordinarily employed in automatic musical instruments commonly known as player pianos. A tracker 4 is also shown with the music sheet 2 passing over the same. The tracker 4 is supported at its ends by upright or vertical side members 5 and 6, which latter also support and carry the upper spindles for the roll 1 and the spool 3.

As a desirable arrangement for carrying out my invention I provide a pair of arms 7 and 8 which are mounted upon a rod 9, said arms 7 and 8 being secured to the rod 9 in such position that said arms will fit just inside of the ends or flanges 10—10 at the ends of the spool 1. The rod 9 is mounted for rotation or rocking motion, as for example, by mounting its ends in the side members 5 and 6, whereby by rocking said rod 9 the arms 7 and 8 may be thrown downward into position between the flanges 10 of the music roll 1, as shown in full lines in Fig. 5, or may be swung upwardly so as to be out of engagement and free from the spool 1, as shown in dotted lines in Fig. 5. Thus the roll 1 may be set in proper place to cause the proper trackage of the music sheet 2, by swinging the arms 7 and 8 down so as to engage the flanges 10 on the roll 1, as shown in Fig. 1, the arms 7 and 8 being so positioned that when in engagement with the roll 1, as shown, said roll will be so positioned that its music sheet will track properly with the tracker board.

Figure 2:
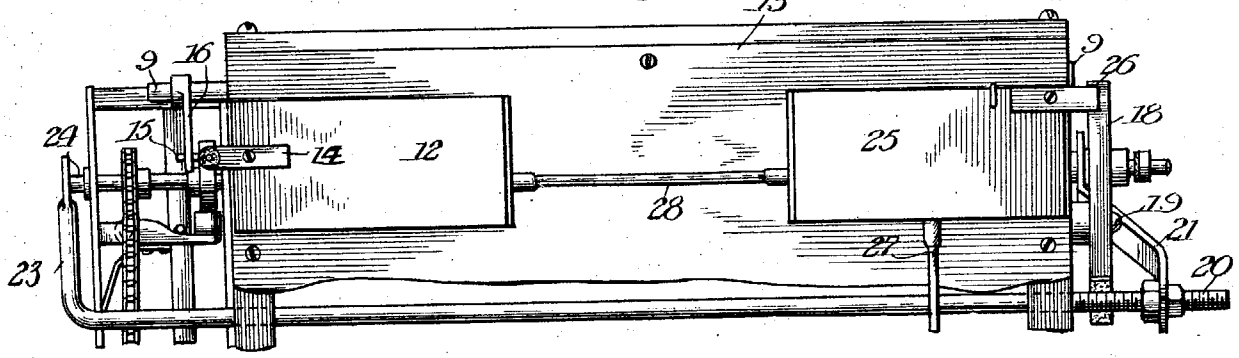
Fig. 2 is a rear elevation of the upper portion of the mechanism shown in Fig. 1.
Figure 5:
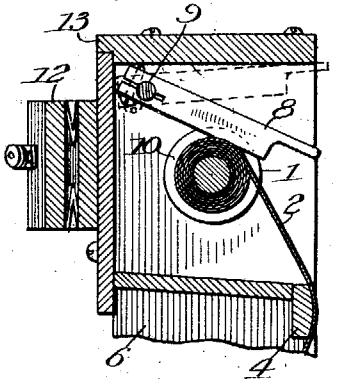
Fig. 5 is a cross section taken on line 5—5 in Fig. 1.
Figure 4:
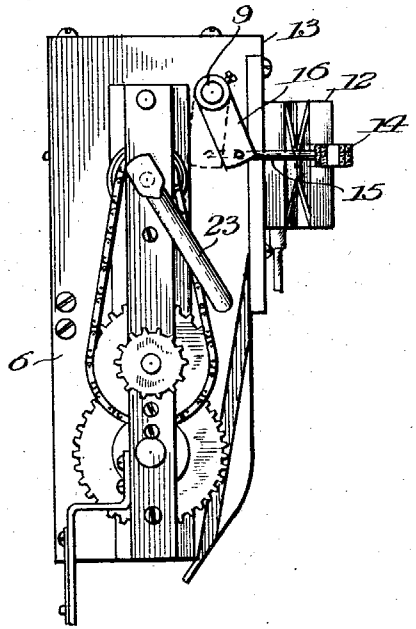
Fig. 4 is a view of the right hand end of the same.

As an arrangement for controlling the arms 7 and 8, preferably automatically, I provide a pneumatic 12 on the back of the music spool box 13, Figs. 2 and 4, and provide this pneumatic 12 with an arm 14 which is connected with a link 15 which extends to and is pivotally connected with a crank arm 16 on the rock shaft 9. Thus the expansion and collapse of the pneumatic 12 will actuate the crank arm 16 and thereby rock the shaft 9 so as to throw the arms 7 and 8 into and out of engagement with the roll 1.

Figure 3:
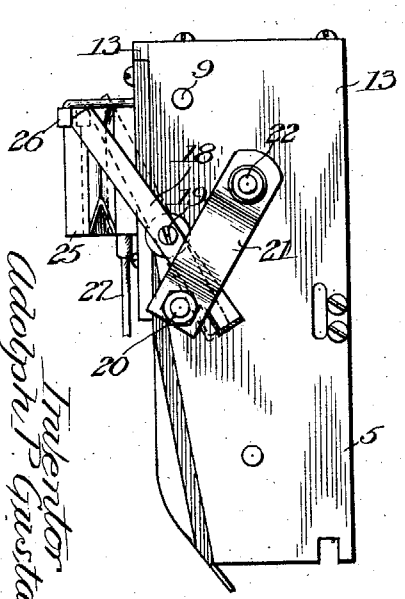
Fig. 3 is an end view of the left hand end of the mechanism shown in Fig. 1.

I also desirably provide means by which the roll 1 may be retained in the longitudinal adjustment to which it is set by means of the arms 7 and 8. The form of arrangement shown comprises a lever 18 pivoted at 19 to the left hand end (Fig. 1) of the music box 13, as shown in Fig. 3. This lever 18 is arranged to swing to and contact with a rod 20 which is connected by a clip 21 with the spindle 22, for the left hand end, (Fig. 1) of roll spindle 22, the other end of the rod 20 being bent upwardly as at 23 to engage the right hand roll spindle 24, whereby the rod 20 and music roll spindles 22 and 24 move in unison lengthwise of the roll 1. Thus a swinging movement of the lever 18 to the position shown in dotted lines in Fig. 3 will cause the lower end of said lever to engage and act against an end portion of the rod 20, and thereby engage and lock said rod so as to prevent longitudinal movement of the same and thereby prevent also longitudinal movement of the roll 1. As an arrangement for operating the lever 18 I show a second pneumatic 25 secured to the back of the box 13 and having its swinging member provided with a finger or clip 26 (Fig. 2) adapted to act upon the upper end of the lever 18, so that when said pneumatic 25 is collapsed the lever 18 will be swung so as to cause its lower end to engage and bind the rod 20. A tube or pipe 27 is shown connected with the pneumatic 25 and another tube 28 running from the pneumatic 25 to the pneumatic 12. The tube 27 is understood to be connected with the wind chest or other duct or passage connecting with the wind inducing apparatus so that when pumping is begun and playing pressure produced, both of the pneumatics 25 and 12 will be exhausted and collapsed, thereby automatically locking the roll 1 and swinging the arms 7 and 8 upwardly and disengaging them from said roll 1. Thus after the roll 1 has been put in position and its end connected with the take-up spool 3, and before playing starts, said roll 1 may be adjusted until the arms 7 and 8 fit between the flanges of the roll, thus properly positioning said roll for proper trackage. Then pumping may be begun, thereby actuating the pneumatics 12 and 25 and thus the arms 7 and 8 will be automatically disengaged from the roll 1, and said roll locked against longitudinal movement and thus maintained in position for proper trackage throughout the playing. When this roll has been played the pneumatics 12 and 25 will expand, thereby releasing the rod 20 and also allowing the arms 7 and 8 to drop. Inasmuch, however, as the arms 7 and 8 may be easily adjusted by hand, they may be raised by hand so as to release and remove the music roll 1. Another roll may then be put in position and like the first one it may be adjusted by means of the arms 7 and 8 to a position which has been predetermined as the correct one for the trackage of the music sheet. This roll when playing starts will be automatically locked in position and the arms 7 and 8 removed so as to avoid interference with the playing. This roll also may be removed after playing and another roll inserted and adjusted in proper position and then played. Thus it will be seen that each roll may be adjusted in proper tracking position, but this is done without any reference to the tracker board and without any experimentation to aid the perforations in the music sheet into register with the apertures in the tracker board. The proper position for the music sheet is instantly determined when the roll is placed in position and the arms 7 and 8 allowed to drop and thus quickness and facility in adjustment and playing are secured, and the result is obtained without any experimentation or adjustment of the sheet relatively to the tracker board.

Referring to the modification shown in Figs. 6, 7 and 8, rods or arms $7^a$ and $8^a$ are shown mounted on the rock shaft 9 and these rods $7^a$ and $8^a$ are provided at their outer ends with clips or roll engaging devices 30. These latter are pivotally mounted upon the ends of the arms or rods $7^a$ and $8^a$, so that they can tilt or swing, as shown in dotted lines in Fig. 6. Each member 30 is provided with a pointed end 31 and has its opposite end cut away as at 32. Thus the pointed end is heaviest and tends to swing down and remain in a lower position with the device inclined as shown in Fig. 6. A handle 33 is also mounted upon the rock shaft 9. Thus the shaft 9 may be rocked so as to cause the members 30 to move toward and away from the roll 1, as shown in dotted and full lines in Fig. 7. With the pointed outer ends of the members 30 inclined downwardly as shown in dotted lines in Fig. 6, the shaft 9 is rocked downwardly by the handle 33 so that one or both of the members 30 engage the flange or flanges at the ends of the roll 1. If but one member 30 engages a flange, a further downward movement of the handle 33 will cause a further downward movement of the arms $7^a$ and $8^a$, and thus will cause a shifting longitudinal movement of the roll 1 by the action upon it of the member 30 engaging one of the roll flanges. This shifting longitudinal movement will continue until the roll is moved so as to cause the other member 30 to engage the other roll flange, the roll, as it were, being moved up to said other member 30. Thus the roll will be properly and accurately positioned or centered by the two members 30 engaging its flanges, the roll being in this way properly and accurately adjusted for the proper trackage of the music sheet. The members 30 will in the meantime have acquired a more nearly horizontal position; if the roll is the usual length they will have acquired practically a horizontal position, as shown in solid lines in Fig. 6. In this modification the shaft 9 is preferably automatically swung upwardly and the roll locked in position by the means described in connection with the first described structure, but as said automatic swinging and locking means are described in connection with said other construction they will not be described here.

It will be seen that the pivoted or tilting members 30 permit the successful operation of the device with rolls of somewhat different length and that such rolls will be properly and accurately adjusted, notwithstanding their difference in length.

It will be understood that changes and modifications may be made without departing from the spirit of the invention.

What I claim is:

1. The combination with means for supporting a music roll, of means for engaging said roll for adjustment, said means comprising a pivoted finger and a supporting structure for said finger by which the finger can be moved so as to engage and move the roll.

2. The combination with means for supporting a music roll, of means for engaging said roll for longitudinal adjustment, said means comprising a pair of pivoted fingers and a supporting structure by which said fingers may be moved toward and away from the roll so as to engage the same and cause an adjustment of the roll.

3. The combination with means for supporting a music roll, of means for engaging the roll for adjustment, said means comprising a pair of pivoted fingers weighted so that one end will swing downwardly, and a movable supporting structure on which said fingers are mounted, said structure holding said fingers in position between the flanges at the ends of the roll and the fingers being arranged so that their weighted ends are toward the flanges, whereby said fingers may engage the flanges and automatically adjust the roll.

4. Means for adjusting a music roll comprising a pair of fingers having pointed weighted ends, and a movable supporting structure on which said fingers are pivotally mounted, said supporting structure being arranged to hold and move the fingers toward and away from the roll between the flanges thereof, whereby the weighted ends of the fingers may strike first against the music sheet on the roll and then slide along said sheet and act against said flanges so as to adjust the roll in one direction or the other.

5. The combination with a music roll and means for supporting the same of a rock shaft extended lengthwise of the music roll, means carried by said rock shaft and extended laterally from the same, said means being adapted to engage the flanges of the music roll, and means for automatically rocking said rock shaft so as to move said flange engaging means toward the music roll.

6. Means for engaging and adjusting a music roll comprising a longitudinally adjustable rock shaft provided with transversely extending arms, and fingers having weighted ends pivotally mounted at the ends of said arms, said transverse arms being located between the music roll flanges and said fingers being arranged with their weighted ends extending toward the flanges so as to engage the same and shift the roll when said rock shaft is rocked.

7. The combination with means for supporting a music roll, of means for engaging the roll to adjust it in position, means for locking the roll in adjusted position, and means for disengaging the engaging means and actuating the locking means.

8. The combination of means for supporting a music roll, a swinging arm for engaging said roll, and a pneumatic for actuating said swinging arm transversely to the axis of the music roll.

9. The combination of means for supporting a music roll, swinging arms for engaging the ends of said roll, a rock shaft on which said arms are mounted, a pneumatic, and a crank and link connection between said pneumatic and said rock shaft for actuating the latter by the operation of the pneumatic.

10. The combination of means for supporting a music roll, a rod extending longitudinally of said music roll and connected with said roll supporting means, a lever for engaging said rod, and a pneumatic for actuating said lever.

11. The combination of means for supporting a music roll, a rock shaft provided with one or more arms for engaging one or both of the flanges at the ends of the music roll, a pneumatic combined with means whereby said pneumatic operates said rock shaft so as to disengage said arms from the music roll, a rod extending longitudinally of the music roll, a lever for engaging said rod to lock the same, and a second pneumatic for actuating said lever.

12. The combination with a music roll and means for supporting the same, of a rock shaft extending lengthwise of the music roll and provided with laterally extending arms having their free ends provided with means for engaging the flanges of the music roll, and means for automatically swinging said rock shaft so as to move said arms toward the music roll to cause engagement of said roll flanges.

13. The combination with a music roll and means for supporting the same, of a rock shaft extending lengthwise of the music roll and provided with laterally extending arms having their free ends provided with means for engaging the flanges of the music roll, means for automatically swinging said rock shaft so as to move said arms toward the music roll to cause engagement of said roll flanges, and means for automatically rocking said rock shaft in a reverse direction to retract said music roll engaging means from said roll.

14. The combination with the tracker, music spool and means for supporting the spool, of means for engaging the latter, and means for automatically moving said engaging means into and out of engagement with the spool.

15. The combination with the tracker and rolls supporting the music sheet, of means for supporting said rolls, separate means for engaging one of said rolls and mechanism for automatically moving said engaging means into and out of engagement with one of the rolls and for adjusting said roll.

16. The combination with the tracker and rolls supporting the music sheet, of means for engaging one of said rolls and means for automatically actuating said engaging means so as to cause the latter to move toward and away from the roll and to engage the flanges of the same.

17. The combination with the tracker, the music spool, means for supporting the latter, and means for engaging said spool, of pneumatic mechanism for operating said engaging means to cause the same to engage and disengage said music spool.

18. The combination with the tracker, the music spool, means for supporting the latter and means for engaging said spool, of pneumatic mechanism for operating said engaging means to cause the same to engage and disengage said music spool, and also for adjusting said music spool after the same has been engaged.

19. The combination with the tracker and music spool of a swinging device adapted for movement toward and away from said spool, and means for automatically operating said swinging member to cause the same to engage and disengage said spool.

20. The combination with the tracker and music spool of a swinging device adapted for movement toward and away from said spool, and pneumatic means for automatically operating said swinging member to cause the same to engage and disengage said spool.

21. The combination with the tracker and music spool of a swinging device adapted for movement toward and away from said spool, and pneumatic means for automatically operating said swinging member to cause the same to engage and disengage said spool, said pneumatic means being adapted to adjust the music spool to a predetermined position.

22. The combination with means for supporting a music sheet, of means for adjusting said supporting means into tracking position and means for automatically holding the same in such position during operation.

23. The combination with a music sheet and roll therefor, of means for engaging the roll and means for automatically holding said roll engaging means in position to hold the music in tracking position during operation.

24. The combination of a music roll and means for mounting the same so as to permit longitudinal movement in either direction, means for engaging the flanges of said roll, and means for automatically actuating said flange engaging means so as to automatically adjust said roll.

25. The combination of a music spool mounted for longitudinal movement in either direction, devices for engaging the flanges of said spool and pneumatic mechanism for controlling said flange engaging devices.

26. The combination of a music spool mounted for longitudinal movement in either direction, devices for engaging the flanges of said spool and pneumatic mechanism for controlling said flange engaging devices, said pneumatic mechanism involving means for moving said flange engaging devices into and out of position of engagement with said flanges.

27. The combination of a music spool, means for supporting the same so as to permit longitudinal adjustment in either direction, a rod extending lengthwise of said spool and provided with projecting arms carrying pivoted fingers which latter are adapted to engage the flanges of the spool so as to permit longitudinal adjustment of the latter, and means for actuating said rod.

28. The combination of a music spool, means for supporting the same so as to permit longitudinal adjustment in either direction, a rod extending lengthwise of said spool and provided with projecting arms carrying pivoted fingers which latter are adapted to engage the flanges of the spool so as to permit longitudinal adjustment of the latter, and pneumatic mechanism for actuating said rod.

29. The combination of a music roll and means for mounting the same so as to permit longitudinal movement in either direction, means for engaging the flanges of said roll, and means for automatically actuating said flange engaging means so as to automatically adjust said roll into tracking position and hold the same in such position during operation.

30. The combination of a music spool mounted for longitudinal movement in either direction, devices for engaging the flanges of said spool and pneumatic mechanism for controlling said flange engaging devices, said pneumatic mechanism involving means for moving said flange engaging devices into and out of position of engagement with said flanges and also for causing said devices to act upon said flanges so as to adjust said spool into tracking position.

31. The combination with means for supporting a music roll, of means for engaging the roll to adjust it in position and means for locking the roll in adjusted position.

32. The combination with means for supporting a music roll, of means for engaging the roll to adjust it in position, and means for automatically holding the roll in adjusted position during playing.

33. The combination with means for supporting a music roll, of means for engaging the roll to adjust it in position, and means for holding the roll in adjusted position during playing, said means being adapted to release the roll when playing is discontinued.

34. The combination with means for supporting a music roll, of means for engaging the roll to adjust it in position, and means for automatically actuating said engaging means.

35. The combination with means for supporting the music roll, of means for engaging the roll flanges and means for automatically actuating said flange engaging means to adjust the roll for trackage.

36. The combination with means for supporting a music roll, of means for engaging the roll to adjust it in position, and means for automatically actuating said engaging means for adjusting and also for releasing the roll.

37. The combination with means for supporting a music roll, of means for engaging the roll to adjust it in position, means for automatically actuating said engaging means, and means for automatically locking the roll in adjusted position.

38. The combination with means for supporting a music roll, of means for engaging the roll to adjust it in position, means for automatically actuating said engaging means, means for automatically locking the roll in adjusted position, and means for automatically releasing the adjusting means when the roll is automatically locked.

39. The combination with means for supporting a music sheet, of means for automatically adjusting said supporting means into tracking position and for holding the same in such position during operation.

In witness whereof I hereunto subscribe my name this 12th day of April, 1920.

ADOLPH PETER GUSTAFSON.